Feb. 24, 1970         A. J. PIPPERT         3,497,224
PACKING RING AND SEAL ASSEMBLY EMPLOYING SAME
Filed Aug. 18, 1966                2 Sheets-Sheet 1
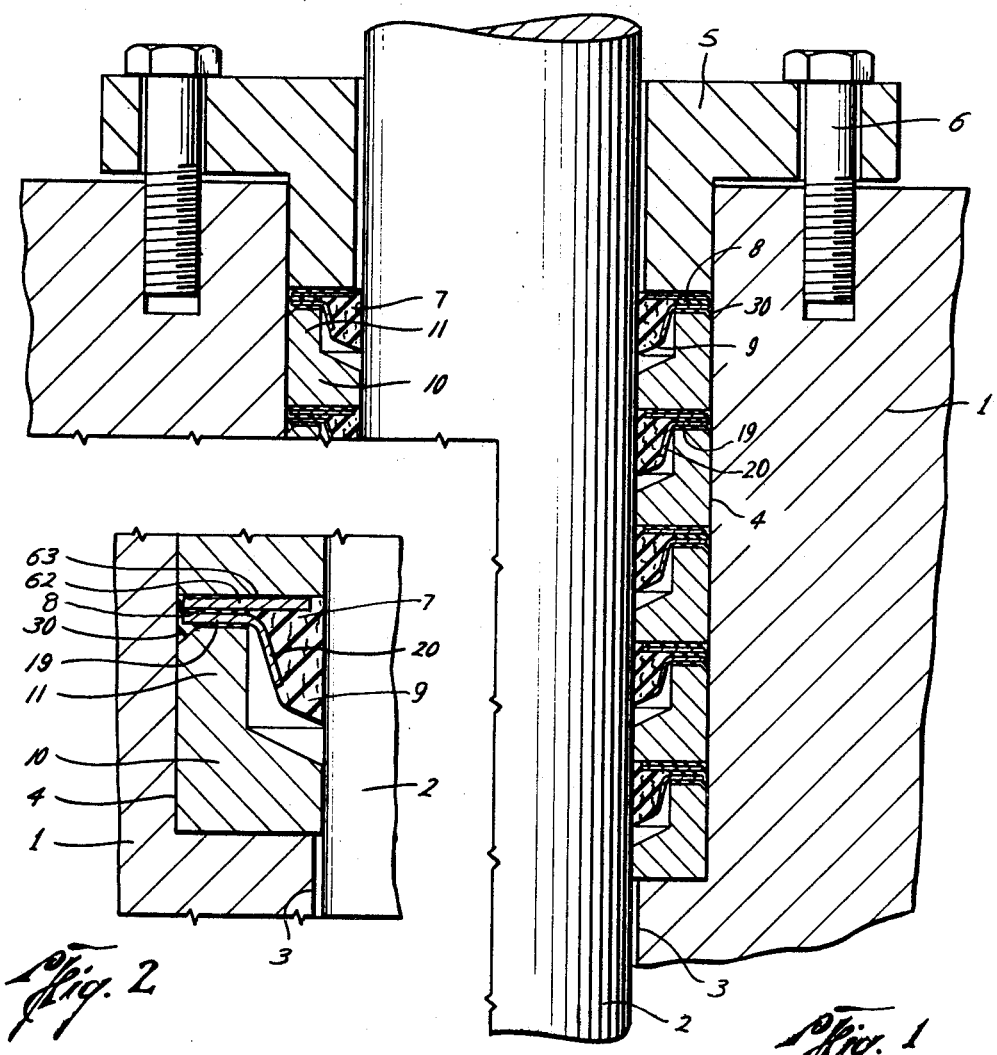
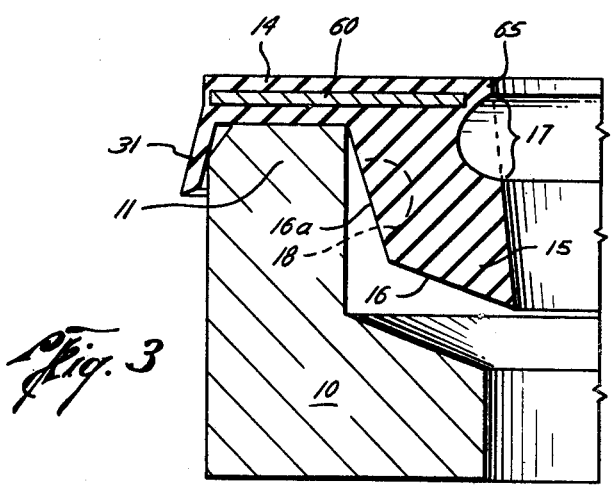
PRIOR ART
Aaron J. Pippert
INVENTOR.
BY Browning, Simms,
Hyer & Eickenroht
ATTORNEYS

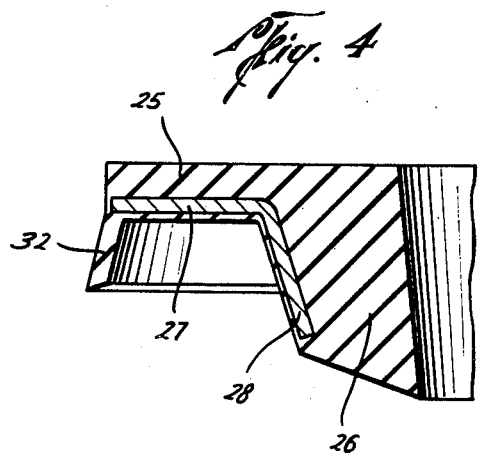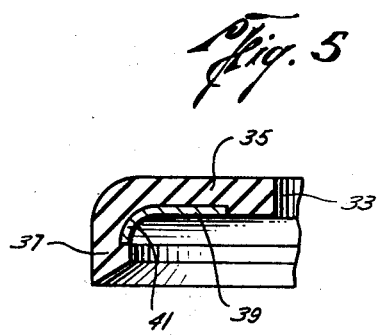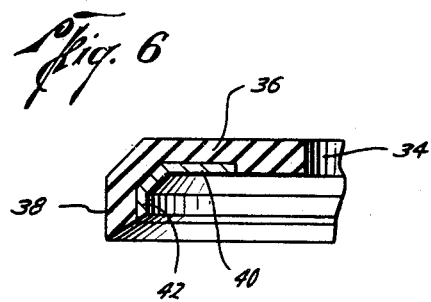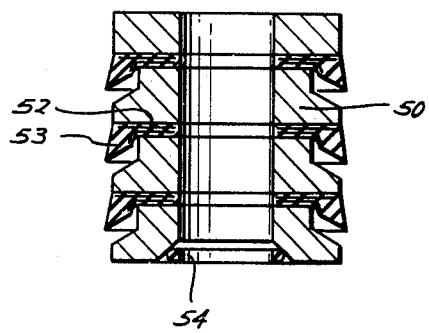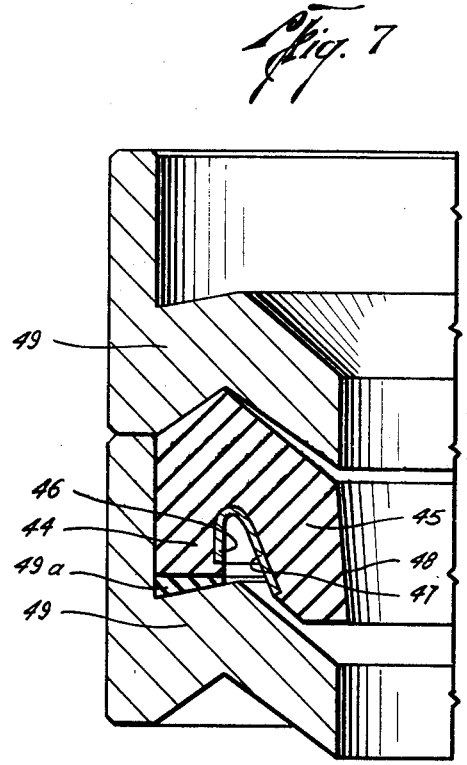

United States Patent Office 3,497,224
Patented Feb. 24, 1970

3,497,224
PACKING RING AND SEAL ASSEMBLY EMPLOYING SAME
Aaron J. Pippert, Houston, Tex., assignor to Universal Packing & Gasket Company, Houston, Tex., a corporation of Texas
Continuation-in-part of application Ser. No. 297,388, July 24, 1963. This application Aug. 18, 1966, Ser. No. 573,389
Int. Cl. F16j *15/20, 15/28*
U.S. Cl. 277—124           11 Claims

ABSTRACT OF THE DISCLOSURE

A packing ring and seal assembly suitable for placing within a stuffing box for the purpose of providing a seal around a reciprocating shaft passing through the stuffing box, in which the packing ring has a body consisting of a base that extends radially and is adapted to be clamped in place in the stuffing box, and an integral lip that extends axially from the base in one direction and is made of flexible material flowable under pressure and adapted to be pressed inwardly against the shaft by the pressure sealed against. In order to prevent an excess of pressure from forcing the lip adjacent the base of the ring too tightly against the shaft so as to cause excessive wear of the ring or scoring of the shaft, the ring has an integral reinforcing pressure shield which extends from the base out along the lip adjacent that surface which is remote from the shaft and serves to prevent pressure from acting directly on the lip in a direction to force it toward the shaft. Instead, the pressure is limited to acting on a portion of the lip adjacent its free edge, which reduces the pressure induced between the lip and the shaft due to the pressure sealed against, and thereby avoids excessive friction and wear of both shaft and ring. The ring is also provided with relatively unyielding reinforcing means within the base, which means occupies so much of the thickness of the base that the ring when clamped with intended force on opposite surfaces of the base will be substantially rigidly held against axial movement. Spacer rings are provided between successive packing rings to provide a complete seal assembly.

---

This application is a continuation-in-part of my prior co-pending application Ser. No. 297,388 filed July 24, 1963 for Composite Non-Adjustable Seal Assembly, which matured into Patent No. 3,284,088, issued Nov. 8, 1966.

This invention relates in general to packing rings and seal assemblies of the type providing a lip type seal against a member moving reciprocably in an axial direction relative to the ring and assembly. Such assemblies are usually made up of one or a plurality of rings each having a lip along one of its peripheral edges extending axially in one direction and integrally formed with a base which extends radially from one peripheral edge on which the lip is located to provide a part whereby the ring can be clamped in position against axial movement while leaving the lip free for radial movement and free to be acted upon by a pressure being sealed against so that the sealing force with which the lip seals against the movable member will increase in proportion to the pressure sealed against. Relatively rigid spacers are customarily provided of lesser radial extent than the packing rings so as to engage the bases of the rings while leaving the lips free, but such spacers normally having their portions which engage the surface of the packing ring opposite the lip of substantially as great a radial extent as the packing ring so as to support the ring throughout its radial extent.

Such arrangements have proven highly satisfactory in usages involving low to medium pressures when the rings are made out of rubber or pliable plastic material, or when used in some of the higher pressures for which they have been found suitable in the past; they have been made in part of fabric impregnated with such rubber or plastic or other hydraulic packing material and in some cases have employed metal reinforcements within the ring bases as illustrated for example in the Christenson Pat. No. 2,106,293, dated Jan. 25, 1938, in FIG. 3 thereof.

However, when employed in connection with extremely high pressures, particularly in situations in which the pressures sealed against fluctuate between high and extremely low, as in the case of reciprocating pump use, it has been found that arrangements of the character shown, for example, in FIG. 2 of the Christenson patent, are incapable of standing up in service. The total axial load placed upon the assembly, both directly by the pressures exerted on the ends of the assembly in the form of the pressures sealed against, and by the mechanical pressures exerted on the assembly in order to prevent it from breathing during fluctuations in such pressures sealed against, have caused the relatively soft material used to provide the seal to flow radially inwardly and outwardly, and being confined against outward flow, to flow in its inward direction into contact with the shaft and exert such pressure thereagainst as to cause the shaft to score and bind. Likewise, the pressure sealed against, acting on the radially outer faces of the lips, such as the lips 8 of the Christenson device, cause such lips to exert excessive pressures against the shaft throughout the extent of the lips and this, as will be presently pointed out, causes rapid and peculiar wear upon the inner surfaces of the lips adjacent their thicker end portions. This results in shorter lives of the packing rings and in some instances even in the separations of the lips from their bases.

It is an object of this invention to provide a packing ring and an assembly for using same which will provide long life and a high efficiency under extremely high pressure service and fluctuating pressure conditions.

It is a further object to provide such a ring and assembly in which the endwise or axial pressures exerted on assemblies containing such rings will not result in the exertion of such radial packing pressures against the piston rods or other members sealed against as to cause them to bind excessively or be subjected to damage or wear more than necessary.

Another object is to provide such a packing ring in which the lip will be protected against excessively high pressures sealed against and against fluctuations thereof in such manner as to avoid excessive wear on the sealing surfaces of the lips adjacent the bases of the packing rings.

Other objects and advantages of this invention will become apparent from the following description taken in connection with the accompanying drawings wherein are shown by way of illustration and example several embodiments of this invention.

In the drawings:

FIG. 1 shows a longitudinal cross-section through a stuffing box having a packing assembly and packing rings constructed in accordance with this invention located therein and sealing about a shaft passing axially therethrough.

FIG. 2 is a fragmentary sectional view on an enlarged scale showing one side of a single unit of a packing assembly consisting of a packing ring and a spacer constructed in accordance with this invention in place within a stuffing box and in sealing relation to a shaft passing therethrough, the ring in this instance being of the same character as those illustrated in FIG. 1.

FIG. 3 is a view of a single assembly of a ring and spacer on even larger scale shown in cross-section and illustrating a ring constructed in accordance with the prior art and showing the type of wear on the sealing surface of the lip which has been experienced with such rings.

FIG. 4 is a view similar to FIG. 3 showing another modification of ring constructed in accordance with one phase of this invention.

FIGS. 5 and 6 are views similar to FIG. 4 but showing other types of rings employing lip type seals of the type commonly called cups with means for protecting the lips against excessively high pressures being sealed against in accordance with this invention.

FIG. 7 is a view similar to FIGS. 4-6 showing still a different type lip seal embodying a lip protector according to this invention and showing the type of spacers used therewith.

FIG. 8 is a view of an assembly of packing rings and spacers each constructed in accordance with one phase of this invention and adapted to provide a seal about the outer edges of the packing rings and within a cylinder or the like instead of about the exterior of a shaft.

In general the present invention attains one of its objectives as illustrated in the drawings by employing a substantially stiff and strong shield of metal or other material of sufficient strength and rigidity to extend from the base of the packing ring where it is anchored out along the lip adjacent that surface of the lip opposite the surface which seals against the reciprocating member, and by this means to limit the action of the pressure sealed against on the lip, in a direction to push it against the member sealed against so as to relieve the interface pressure between the lip and the member sealed against at the position at which in the past it has been highest and produced the most wear. Other excessive pressures experienced in the prior art between the packing ring and the member sealed against and generally caused by the endwise pressure on the packing assembly as a whole either due to the pressure sealed against or due to mechanical pressure exerted in an effort to prevent breathing of the packing assembly under fluctuations or pressure, have been inhibited in accordance with the present invention by providing the base of the packing ring with its axial bearing surface opposite the lip free of such extrudable material as might be caused under excessive pressures to flow in a radial direction and cause binding against the surface sealed against. Likewise, on the surface of the packing ring from which the lip extends the reinforcing means have been so arranged as to prevent crowding of extrudable material of the packing ring toward the member sealed against so as to exert excessive pressures thereon.

Referring now in more detail to the drawing, FIG. 1 illustrates one common usage of packing rings and packing assemblies constructed in accordance with this invention. In this figure is shown a fragment of a wall 1 having a shaft 2 extending therethrough and intended for reciprocation in a direction axially of the shaft. To provide passage for the shaft wall 1 has an opening 3 therethrough with a counter bore 4 extending from the outer end thereof to receive a packing assembly comprising a series of packing rings, spacers and the like, same being held in place by a gland 5 secured to the outside of the wall 1 by means of cap screws 6 or the like.

In the packing assembly shown, a plurality of lip type packing rings 7 are illustrated each having a base part 8 and an axially extending lip 9 integral with the base along its inner edge and extending axially along the surface of the shaft 2 to be deflected inwardly toward the shaft and provide the necessary seal thereagainst. These packing rings are held in place by means of spacers 10 interposed therebetween, each spacer having one end part 11 of lesser radial extent bearing against base 8 of a seal ring around the outside of the lip 9 of such ring, so as to leave the lip free to be acted upon by the pressure sealed against, with the opposite end of each of these spacers being of the full radial extent of the space between the interior of the stuffing box provided by the counter bore 4 and the exterior of the shaft 2, this fit being, of course, loose enough so as not to produce any binding against the shaft. This figure shows the very common expedient of employing spacers 10–11 between adjacent packing rings within such a stuffing box.

Turning for the moment to FIG. 3, there is illustrated a single packing assembly in cross section including one of the spacers 10 and a packing ring similar in cross section to those shown in FIG. 1 but not employing the present invention, such ring being shown with wear indicated as having occurred in the use of such rings of the prior art under conditions of high and fluctuating pressures. In the prior art ring of FIG. 3, the base 14 is shown with one end 11 of the spacer 10 thereagainst the same as in FIG. 1 and with the lip 15 extending in an axial direction alongside of the portion 11 of the spacer 10, the same as the similar lips 9 of FIG. 1. However, the lip 15 of FIG. 3 in accordance with the prior art was constructed of a flexible material which may be either rubber or flexible plastic or a fabric or other hydraulic packing suitably molded into the lip shape desired. Under extremely high pressures, particularly when such pressures fluctuate, these pressures would be exerted on the lip 15 over the entire surface 16 and 16a. Characteristically this has seemed to place a much greater unit pressure within the base portion of the lip near the base of 14 than out toward its extremity. The result has been that wear has taken place along the zone near the base as indicated at 17 much more than along those portions of the lip more remote from the base. As wear begins to take place along the zone 17, material from further back in the lip is displaced until the wear takes the form of a groove, as shown within the area 17. Each time the pressure increases and decreases the portion of the lip in between the area 17 and opposite area indicated by the dotted line 18, the material moves first toward the area 17 under the pressure sealed against and then away from such area 17 as that pressure is released. This characteristic of wear of the lips naturally in short order causes them to become inefficient and in many instances it has been observed that the lips will be nearly or completely severed from the base by continuance of such wear.

In order to combat the situation just described the present invention employs one or more reinforcing elements, two of such being illustrated in FIG. 2 wherein the same type of packing ring is employed as in FIG. 1. One of these reinforcing members in FIG. 2 is shown as being a plate 19 anchored to, and in this instance actually imbedded in the base and extending radially outwardly so that along its complete circumference its outer edge lies fairly closely adjacent the outer edge of the base of the packing ring. The inner edge of this reinforcing member is disposed at an angle to that imbedded in the base so as to provide a portion 20 which extends in a generally axial direction preferably substantially parallel to and adjacent the surface of the lip which is opposite the shaft 2 that is being sealed against. This axially extending portion 20 of the reinforcing member serves to take a large part of the pressure being sealed against which is normally exerted in almost directly radial direction through the lip against the shaft on the opposite side thereof. The extent of such lip shield or protecting portion of the reinforcing member toward the free edge of the lip may be greater or lesser depending upon the magnitude of the pressures expected and serves to reduce the area of the lip which is subject to being deflected by the pressure being sealed against, removing from the action of such pressures those portions of the lip directly opposite the parts which have in the prior art suffered the greater wear in their engagement with the shaft 2 or other member being sealed against.

By this expedient it has been found that wear such as that illustrated in FIG. 3, and the accompanying binding and frictional engagement of the lip against the shaft in excess of that required to make a proper seal has been substantially eliminated. The result has been a dramatic increase in the life of packing rings of this character under extremely high pressure fluctuating pressure usage.

For the purpose of thus providing a shield to protect the flank of the lip or that portion of the lip closest to the base from excessive pressures thereagainst and thus relieve wear of the type indicated at 17 in FIG. 3 it is unnecessary that the reinforcing member extend all the way to the extremity of the base on the opposite edge thereof from the lip as shown in FIG. 2. All that is necessary is that it be anchored in the base and extend therefrom out along or immediately inside the surface of the lip which is most remote from the member sealed against. The extension of the reinforcing element toward the opposite edge of the base from the lip as shown in FIG. 2 and FIG. 4, for example, give somewhat greater stability to the portion 20 of this reinforcing member but mainly serves as a more effective stiffener for the base so that the ring may be more firmly held in its proper position for the desired seal.

In FIG. 4 there is shown a cross-section through a ring of substantially the same shape as illustrated in FIGS. 1, 2 and 3, this ring having a base 25 with inner and outer edges the same as the base 14 of FIG. 3, for example, or the base 8 of FIG. 1. This ring also has a lip 26 similar to the lip 9 of FIG. 2 and the reinforcing member having a part 27 anchored in the base 25 and a part 28 providing a shield for the lip in the same manner as the part 20 in FIG. 2.

In all of the FIGS. 1, 2, 3 and 4 the packing rings illustrated are arranged for sealing against a member passing therethrough. Thus the sealing lips in each case are disposed along the radially inner-most edge of the base and are adapted for deflection radially inwardly by pressures being sealed against. Actually, they preferably initially have an unflexed disposition with the lips projecting slightly radially inwardly beyond the inner-most edge of the base in each case so as to provide an initial seal against a member to be sealed against. In each of these four figures also, there is shown a small unreinforced lip type member indicated as 30 in FIGS. 1 and 2, 31 in FIG. 3 and 32 in FIG. 4 adapted for sealing against a surface stationary relative to the packing ring such as the outer wall of the stuffing box provided by the counter bore in FIG. 1. Such lip however, forms no part of the present invention and has merely been found useful in connection with packing rings of the type illustrated in FIGS. 1 and 4 inclusive.

That phase of the invention involving the reinforcing shield for shielding the lip against excessive pressures is, however, applicable to other shapes and types of packing rings or seal rings as shown in FIGS. 5, 6, 7 and 8.

FIGS. 5 and 6, for example, show two different types of what are referred to commonly as cups. These are annular with an opening 33 or 34 therethrough and have bases 35 and 36, respectively, with lips 37 and 38 extending axially from the bases, in this instance from the outer edges of the bases, because these lips are adapted to seal against cylindrical members surrounding the packing rings instead of against shafts passing therethrough as in FIGS. 1 to 4. In accordance with this invention there is anchored at 39 in FIG. 5 and at 40 in FIG. 6 a reinforcing member in each case having an extension out along the surface of the lip opposite the sealing surface thereof as illustrated at 41 and 42 in FIGS. 5 and 6, respectively. The portions 41 and 42 of these reinforcing members serve as shields for the lips 37 and 38 enabling them to withstand excessively high pressure, the same as do the shield portions 20 and 28 of the reinforcing members shown in FIGS. 2 and 4.

On reference to FIG. 7, still another type of packing ring is illustrated in which the base 44 extends more nearly axially than do the bases of the rings previously described, but in which, as in the other instances, there is a lip 45 extending axially from one edge of the base and there is a reinforcing member having a portion 46 anchored in the base and another portion forming a pressure shield 47 extending from the base out along that surface of the lip opposite the surface 48 which is adapted to seal against a member passing therethrough. In this instance, likewise, the packing member is a ring or annulus and in this instance the lip 45 is disposed to seal against a member passing therethrough and extends from the radially inner edge of the base rather than from the radially outer edge thereof. Spacers such as 49 are employed with this type of ring and cushioning gaskets 49a may be used therewith to properly grip the bases 44 of the packing rings. From this illustration it will be noted that the phase of this invention having to do with a shield portion of the reinforcing member for protecting the lip is not limited to a base in which the major dimension is radial, but is applicable also to a situation in which the base is one with the major dimension being axial. In each case, however, reference to the edge of the base as being a portion from which the lip extends, has reference to the radially innermost portion of the base or the radially outermost portion, as the case may be. While the invention is especially adapted for use in sealing against axially movable or reciprocating members such as shafts or plungers, it may be used in such seals for sealing against a rotating shaft or the like. The form in FIG. 7 is especially well adapted for such use.

Nor is the provision of a shield for protecting a lip of the packing ring against excessive pressure thereon limited to such a lip arranged to seal against a member passing therethrough or to one extending therearound for any given shape of cross section of seal ring. For example, in FIG. 8, there is shown seal rings having cross section shapes very closely approximating those shown in FIGS. 1, 2 and 3, but with the lips along the outer edges of the bases instead of along the inner edges so as to seal about a cylindrical member extending around the outside of the seal assembly. Such an arrangement would normally be mounted on a piston rod or similar device for reciprocation within a cylinder or for extending into a cylinder which reciprocates relative thereto.

In FIG. 8 the spacers 50 are similar to the spacers 10 shown in FIG. 1 except that their greatest axial dimension is adjacent their radially innermost surface instead of adjacent their radially outermost surface, as in the case of the spacers 10. The packing rings shown in FIG. 8 have bases 52 and lips 53 extending axially from their radially outer edges instead of from their radially inner edges, as in the case of the rings shown in FIG. 1 and, in the instance shown, do not have the small lips 30 adapted to provide a seal against a surface static relative to the assembly as in FIG. 1, but rather the assembly has an auxiliary seal ring 54 at one end of the assembly to provide a seal against the piston rod or other member on which the assembly is mounted.

In the case of packing rings for certain purposes, particularly those used for withstanding pressures in the lower pressure ranges, the rings may be made in what are known as "adjustable" varieties. Such rings may be of any of the cross sections illustrated in the drawings of this application or of other cross sections having base portions by which the rings are adapted to be clamped in place by an endwise clamping action as by the action of the cap screw 6 on the gland 5 of the FIG. 1, but these bases of such adjustable rings are made largely or wholly of material which can be extruded under considerable pressure. In some cases these bases may have fabric or other material embedded therein for the purpose of reinforcing and making less extrudable under endwise pressure or they may have a single reinforcing member of metal or other hard material extending through the base, as in the case of the reinforcement 60 in FIG. 3 and the portion 27 of the reinforcing member shown in FIG. 4. It is to be noted, however, that in each of these instances and also in the cases of the base portions of the rings shown in FIGS. 5, 6 and 7, an axial pressure on the base portion will be exerted upon a considerable volume of material which, under substantial pressure, is capable of being extruded in a radially inward and radially outward direction. When a plurality of packing rings with spacers therebetween are clamped together, as in a stuffing box by the action of a gland, until the unit axial pressure exerted on the rings is at least equal to the working pressure to be sealed against and those portions of the rings opposed to the surface, such as the stuffing box wall, are in tight sealing engagement and usually in solid continuous engagement with such wall, the rings are said to be "seated." Further axial compression must result in extension toward the movable member, such as a reciprocal shaft. These so-called "adjustable" rings are characterized by the fact that when they are clamped in place to the degree that the rings are "seated" they compress somewhat but do not compress to a positive stop. They merely increase resistance gradually as they are compressed. After seating they may be compressed still further by increased tightening, particularly after the rings have "set" during a short period of use. They offer no real stop against further compression of the ring base until compressed far beyond the point at which the rings become seated.

As illustrated in FIG. 4, the lip shield reinforcing member may be employed in connection with such adjustable packing rings and will serve to protect the lip against excessive total pressure thereon on the surface opposite the member being sealed against even though the portion of the reinforcement in the base be equal to or of less extent than that illustrated in FIG. 4 by the numeral 27, or even non-existent.

However, when rings are to be employed in withstanding pressures of the order of 8,000 to 12,000 lbs. per square inch, especially in situations in which those pressures fluctuate widely from such maxima to relatively low minimum pressures, the so-called adjustable type of packing rings have their bases extruded under such pressures and fluctuations of pressures and have such great tendencies to "breathe" under the fluctuations of pressures, that their lives are quite short.

In accordance with this invention additional reinforcement is incorporated into the bases of the rings intended for such extremely high pressures, preferably to such a degree that the metal reinforcements will occupy a large portion of the total axial dimension or thickness of the base of the ring, so as to render them "non-adjustable," that is, they will offer a positive stop against further compression just beyond the stage of compression at which the rings become fully seated. Thereafter they cannot be compressed further by compressing forces which are not so great as to destroy the rings, and are not subject to breathing in use under pulsating pressures nor to "adjustment" after a period of use. This is clearly illustrated in FIG. 2 of the drawing by comparison with FIG. 4 and also by comparison with FIG. 3.

There is a further problem, even when the thickness of reinforcement is such as to render the rings "non-adjustable." It has been found, for example, that in the use of reinforcing members such as illustrated at 60 in FIG. 3 and 62 in FIG. 2, which extend substantially from edge to edge of the base, excessive axial force applied to the opposite surfaces of the base, as by extremely high tightening forces or fluid pressures, not only tend to extrude the material under the portion 11 of the spacer 10 toward the lip (because of the fact that the extrusion in the opposite direction is stopped by the wall of the stuffing box), but the same action occurs on the opposite side of the reinforcing member 60. When this portion of the extrudable material flows radially inwardly it cannot expand into the lip as can the portion on the lower side of this reinforcement, but is instead squeezed with extremely high pressures against the rod or shaft passing therethrough. In actual practice it has been found that when the extrudable material overlying the reinforcement is of substantial thickness such extremely high pressures result both in excessive wear of the ring and of the shaft and at times becomes so great as to substantially lock the shaft against movement.

In order to cope with this problem it has been found that this can be done by placing the reinforcement in the base so that not only does it take up a major portion of the thickness of the base in an axial direction, but also so that that reinforcement which extends substantially the entire distance from the outer to the inner dimension of the base is not spaced substantially from the exposed axial surfaces of the base, as in FIG. 3, but is placed as shown by the reinforcing member 62 of FIG. 2. When this is done the extrudable material 63 which overlies the reinforcing member 62 is so thin that there is insufficient extrudable material at this location to cause any such excessive pressures or wears as above-mentioned. Thus, in accordance with this invention, this second type or excessive pressure and wear which will occur under extremely high pressures in the case of the packing ring shown in FIG. 3 at substantially the point 65, and might even tend to lock the shaft passing therethrough against movement, is dealt with by making that portion of extrudable material overlying the reinforcement that extends substantially the entire radial dimension of the ring of insufficient thickness to apply such excessive pressures.

Thus, this invention provides means for guarding against excessive pressures on a member intended to be sealed against by a lip type packing ring so that such lip type packing rings can be made for use under extremely high and widely fluctuating pressures without the excessive wear heretofore experienced with packing rings of the lip type under such conditions and without the tendency toward excessive wear and possible freezing of the shafts or other members sealed against. As a matter of fact, seal rings of previously employed types but of substantially the same cross sectional shape have been found to last under extreme pressure conditions for perhaps a run of 30 to 40 hours whereas seal rings constructed in accordance with this invention under the same circumstances have operated in excess of 300 hours without showing excessive wear.

From the foregoing, it will be seen that this invention is one well adapted to attain all of the ends and objects hereinabove set forth.

The invention having been described, what is claimed is:

1. A packing ring comprising an annular relatively rigid base having radially inner and outer edges, an annular relatively flexible lip integrally carried by and extending axially in one direction from one of said edges of said base and having a free edge extending, when undeflected, radially beyond said one edge of the base to engage and seal against an axially movable member, and an annular reinforcing member of material incompressible and non-extrudable under pressures for which the ring is to be employed, said annular reinforcing member having one annular part integrally anchored in said base and an integral annular part extending from said base along and integrally with said lip a substantial portion of the distance toward the free edge of said lip, said integral annular part being adjacent that surface of the lip most remote from said one edge of the base to strengthen that portion of the lip adjacent the base against excessive pressures urging it radially past said one edge of the base.

2. A packing ring as set forth in claim 1, in which the one annular part within said base takes up such portion of the axial thickness of said base where said lip does not overlie the base, as to provide a positive stop against further compression after said base has been compressed axially sufficiently to set the ring, and the axial surface of said ring base on the opposite side from said lip is free of extrudable material overlying the one annular part in thickness sufficient to extrude radially toward said one edge of said base when under axial bearing load in use.

3. A packing ring as set forth in claim 1 in which there is a second annular reinforcing member which is located entirely within the base.

4. A packing ring as set forth in claim 3 in which said second reinforcing member extends substantially throughout its entire circumference from a position adjacent the inner to a position adjacent the outer edge of said base.

5. A packing ring as set forth in claim 3 in which the second reinforcing member extends throughout its circumference from a position adjacent said outer edge to a position adjacent said inner edge of the base and in which said reinforcing member which extends along said lip has a portion within said base which throughout its circumference extends from adjacent said lip to adjacent that edge of the base which is opposite the lip.

6. A packing ring as set forth in claim 1 in which said base has an axial bearing surface facing in one axial direction opposite from said lip and in which there are two of said reinforcing members, one of which is entirely within said base adjacent said load bearing surface and throughout its circumference extending from a position adjacent the inner to a position adjacent the outer edge of said base and in which said base on said axial load bearing surface is free of extrudable material overlying said last mentioned reinforcing member in thickness sufficient to extrude substantially radially toward the edge of said base from which said lip extends when under axial bearing load, whereby when said ring is installed with said lip in sealing engagement with a reciprocable member for reciprocation past the same in an axial direction to provide a high pressure seal in one direction thereagainst, there will be insufficient of said extrudable material overlying said reinforcing member on said axial bearing surface of the base to be extruded radially toward said lip to cause scoring or binding of the reciprocable member, and so that the pressure sealed against acting upon the surface of said lip opposite said reciprocable member cannot force it against said reciprocable member with excessive total pressure to cause excessive wear thereof.

7. A packing ring as set forth in claim 6 in which said lip is along the inner edge of said ring and is adapted to be located in a stuffing box and the reciprocable member is a shaft passing through said stuffing box substantially coaxially with said ring.

8. A packing ring as set forth in claim 1 in which said lip is along the inner edge of said base to seal against a shaft passing therethrough and said ring is adapted to be employed in a stuffing box for providing a seal about such shaft against leakage of pressure fluid therealong in one axial direction.

9. A composite seal assembly comprising a packing ring having an annular base of relatively hard material unyieldable under compression in an axial direction, said base having an axial bearing surface facing in one axial direction to provide an axial load bearing surface for the assembly, said axial bearing surface being free of extrudable material in thickness sufficient to extrude substantially radially inwardly under axial bearing load whereby upon installing said ring in a stuffing box so as to seal about a reciprocable shaft passing therethrough against high pressure in one direction along the shaft and so as to confine any extrudable material on said bearing surface against extrusion radially outwardly, there will be insufficient of said extrudable material extruded radially inwardly to cause scoring or binding of the shaft; an annular flexible lip integrally carried by and extending axially from said base in the opposite direction from said bearing surface and having a part extending, when undeflected, radially beyond said base in a radially inward direction to engage and seal against the shaft and having a surface free of restraint in use to permit increase in volume of said lip, and annular axial spacer and support member additional to said ring and of material hard and unyieldable under pressure having a part extending axially in one direction and engaging said base on the same side as said lip and of a radial position and extent to clear said lip, and a part extending axially in the other direction beyond said lip to form a second oppositely exposed axial bearing surface of the same radial extent and position as said first-mentioned axial bearing surface to engage the first-mentioned axial bearing surface of another packing ring of the same kind as said first-mentioned packing ring.

10. A composite seal assembly comprising a packing ring with an annular base having a core of metal coated with a thin layer of seal material bonded thereto, said layer on one axial surface being of insufficient thickness to provide significant change in axial dimension of the combined core and layer on said one axial surface between conditions of no pressure and maximum operating pressure thereon, and a seal means including an annular lip carried by and extending axially from said base in the opposite direction from said one axial surface and having a part extending, when undeflected, radially beyond said base in one radial direction; and an annular axial spacer and support member separate from said ring, said spacer and support member being of material hard and unyieldable under compression having a part extending axially and engaging said base on the axial surface most adjacent said lip and of a radial position and extent to clear said lip, and providing a rigid support between the axial surface of said base most adjacent said lip and a remote end of the assembly.

11. A packing ring comprising an annular relatively rigid base having radially inner and outer edges, an annular relatively flexible lip integrally carried by and extending axially in one direction from one of said edges of said base and having a free edge extending, when undeflected, radially beyond said one edge of the base to engage and seal against an axially movable member, and an annular reinforcing member of material incompressible and nonextrudable under pressures for which the ring is to be employed, said reinforcing member having an annular part integrally anchored in said base, said annular part within that portion of the base which the lip does not overlie taking up a sufficient portion of the axial thickness of said base to render the base unyieldable in an axial direction under pressure variations to be encountered in the use intended, after said base has been compressed axially sufficiently to seat said ring.

References Cited

UNITED STATES PATENTS 2,106,293   1/1938   Christenson _____ 277—124

FOREIGN PATENTS 407,262   9/1944   Italy.

LAVERNE D. GEIGER, Primary Examiner
JEFFREY S. MEDNICK, Assistant Examiner

U.S. Cl. X.R.
277—125, 212, 235